US009510095B2

(12) United States Patent
Takahashi

(10) Patent No.: US 9,510,095 B2
(45) Date of Patent: Nov. 29, 2016

(54) SOUND EMITTING AND COLLECTING APPARATUS, SOUND SOURCE SEPARATING UNIT AND COMPUTER-READABLE MEDIUM HAVING SOUND SOURCE SEPARATION PROGRAM

(71) Applicant: Oki Electric Industry Co., Ltd., Tokyo (JP)

(72) Inventor: Katsuyuki Takahashi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 77 days.

(21) Appl. No.: 14/271,693

(22) Filed: May 7, 2014

(65) Prior Publication Data

US 2014/0341384 A1 Nov. 20, 2014

(30) Foreign Application Priority Data

May 17, 2013 (JP) ................................ 2013-105479

(51) Int. Cl.
*H04B 15/00* (2006.01)
*H04R 3/00* (2006.01)
*G10L 21/0208* (2013.01)
*G10L 21/0216* (2013.01)

(52) U.S. Cl.
CPC ........... *H04R 3/005* (2013.01); *G10L 21/0208* (2013.01); *G10L 2021/02161* (2013.01); *H04R 2410/05* (2013.01); *H04R 2499/13* (2013.01)

(58) Field of Classification Search
CPC .............. H04R 3/005; H04R 2410/05; H04R 2499/13; H04R 2499/11; G10L 21/0208; G10L 2021/02165; G10L 2021/02161
See application file for complete search history.

(56) References Cited

U.S. PATENT DOCUMENTS

2005/0157890 A1* 7/2005 Nakajima et al. .............. 381/92
2010/0191527 A1* 7/2010 Matsuo et al. ................ 704/226
2010/0284544 A1* 11/2010 Kim .......................... H04S 7/30 381/56
2013/0066628 A1 3/2013 Takahashi
2013/0336500 A1* 12/2013 Sudo ............................ 381/94.1

FOREIGN PATENT DOCUMENTS

JP 2013-061421 A 4/2013

OTHER PUBLICATIONS

Nobuhiko Kitawaki, "Stereo Echo Canceller and Teleconference with High Realistic Sensation, Digital Voice/Audio Technology", The Telecommunications Association, p. 235-243, Dec. 15, 1999.

* cited by examiner

*Primary Examiner* — Andrew L Sniezek
(74) *Attorney, Agent, or Firm* — Rabin & Berdo, P.C.

(57) ABSTRACT

The present invention relates to a sound emitting and collecting apparatus including a sound collecting portion that captures surrounding sound using two microphones, and a sound emitting portion that emits sound from at least one speaker. The apparatus includes a sound source separating portion that extracts a target sound from a sound source in a predetermined direction, based on an input sound signal obtained by capturing surrounding sound using the two microphones, and an emission non-target sound removing portion that removes a non-target sound that is emitted from the speaker and captured by each of the microphones, based on sound source data for the sound emitting portion. The emission non-target sound removing portion is provided on a path that reaches the sound source separating portion. The emission non-target sound removing portion has a structure similar to an acoustic echo canceller, for example.

8 Claims, 5 Drawing Sheets

SOUND EMITTING AND COLLECTING APPARATUS, SOUND SOURCE SEPARATING UNIT AND COMPUTER-READABLE MEDIUM HAVING SOUND SOURCE SEPARATION PROGRAM

CROSS REFERENCE TO RELATED APPLICATION(S)

This application is based upon and claims benefit of priority from Japanese Patent Application No. 2013-105479, filed on May 17, 2013, the entire contents of which are incorporated herein by reference.

BACKGROUND

The present invention relates to a sound emitting and collecting apparatus, a sound source separating unit and a computer-readable medium having a sound source separation program, and can be applied to a communication terminal, an audio device and the like that are required to separate only sound (hereinafter referred to as a target sound) that comes from a sound source in a predetermined direction, from voice and sound etc. captured by a microphone, for example.

For example, when voice communication is input into a smart phone or when a voice command is input into an audio device, a smart phone or the like, it is desirable that the device that receives voice extracts only voice coming from the front where the mouth of a user is assumed to be, by distinguishing it from voice, music and noise etc. that come from other directions.

Japanese Patent Application Publication No. JP-A-2013-061421 discloses a system (a sound source separation system) which captures sounds input to two microphones and suppresses surrounding noise based on a phase difference between the input sounds (electrical signals), thus extracting a target sound that comes from a predetermined direction (the front, for example) of the microphones.

A target sound extraction method described as a third embodiment in Japanese Patent Application Publication No. JP-A-2013-061421 is a technique that suppresses noise components (non-target sounds) that come from the left and right, by multiplying an input sound signal by a suppression coefficient for each frequency component. The suppression coefficient corresponds to a correlation between two signals obtained by forming two directivities having dead angles to the left and right of the microphones. A target sound extraction method described as a fourth embodiment in Japanese Patent Application Publication No. JP-A-2013-061421 is a technique that forms a directivity having a dead angle to the front of the microphones, and suppresses noise components (non-target sounds) that come from the left and right by subtracting, from the input sound signal, a signal obtained by forming the directivity, as noise components that come from the left and right.

SUMMARY

Meanwhile, in recent years, a sound emitting and collecting apparatus 1 having the following structure is being used to talk with a person in a remote place. As shown in FIG. 4, in the sound emitting and collecting apparatus 1, a pair of speakers 3L and 3R are disposed on both sides of a sound collecting device 2 having a communication function, such as a mobile terminal (a smart phone or a tablet terminal, for example), and the speakers 3L and 3R are connected.

Further, a method is being examined that receives a voice command issued by a user from the front of a microphone of the sound collecting device 2 in a state in which sound (music) that is based on a music file recorded in the sound collecting device 2 or a music file acquired from a music distribution site on the Internet is being emitted from the speakers 3L and 3R on the both sides of the sound collecting device 2, using a similar structure to that described above.

In the state in which music or the like is emitted from the speakers 3L and 3R on the both sides, when a target sound that comes from the front is extracted and conversation content is transmitted to the other person on the phone, or when a voice command is recognized by speech recognition processing and processing corresponding to the voice command is performed, sound emitted from the speakers 3L and 3R etc. becomes noise, and the speech quality and the speech recognition rate significantly deteriorate.

To address this, it is necessary to suppress noise components coming from the speakers 3L and 3R on the both sides and to extract the target sound coming from the front, by applying a sound source separation system such as the technology described in Japanese Patent Application Publication No. JP-A-2013-061421. When the sound source separation system described in Japanese Patent Application Publication No. JP-A-2013-061421 is applied, it is necessary to mount two microphones 4L and 4R on the sound collecting device 2 or externally attach the microphones 4L and 4R, as shown in FIG. 5.

However, when the user enjoys music emitted from the sound emitting and collecting apparatus 1, the volume of the music is high and the high volume of music is captured by the microphones 4L and 4R as noise components (non-target sounds). As a result, even when the target sound is extracted by applying the sound source separation system, many noise components remain in the extracted target sound signal.

To avoid this, it is sufficient for the user to input voice, such as a voice communication or a voice command, after the user has stopped the output (emission) of the music. However, if a key operation or the like is performed to stop the output in this manner, the merit of the voice command is reduced and it is easier to input a command by a key operation or the like. Further, when talking on the phone as a result of an incoming call, it is not possible to perform a voice output stop operation or a situation occurs in which there is a delay in receiving the incoming call as a result of performing the output stop operation.

In light of the foregoing, it is desirable to provide a sound emitting and collecting apparatus, a sound source separating unit and a computer-readable medium having a sound source separation program that are capable of extracting a target sound from an intended sound source with a favorable SN ratio even in a situation in which there is emitted sound.

According to a first aspect of the present invention, there is provided a sound emitting and collecting apparatus including a sound collecting portion that captures surrounding sound using two microphones, and a sound emitting portion that emits sound from at least one speaker. The sound emitting and collecting apparatus includes: (1) a sound source separating portion that extracts a target sound from a sound source that is in a predetermined direction, based on an input sound signal obtained by capturing surrounding sound using the two microphones; and (2) an emission non-target sound removing portion that removes a non-target sound that is emitted from the speaker and captured by each of the microphones, based on sound source data for the sound emitting portion, the emission non-target sound removing portion being provided on a path that reaches the sound source separating portion. (3) The sound emitting and collecting apparatus extracts the target sound by using the emission non-target sound removing portion to remove the non-target sound, and using the sound source separating portion to remove other non-target sound.

According to a second aspect of the present invention, there is provided a sound source separating unit that is applied to a sound emitting and collecting apparatus including a sound collecting portion that captures surrounding sound using two microphones and a sound emitting portion that emits sound from at least one speaker. The sound source separating unit includes: (1) a sound source separating portion that extracts a target sound from a sound source that is in a predetermined direction, based on an input sound signal obtained by capturing surrounding sound using the two microphones; and (2) an emission non-target sound removing portion that removes a non-target sound that is emitted from the speaker and captured by each of the microphones, based on sound source data for the sound emitting portion, the emission non-target sound removing portion being provided on a path that reaches the sound source separating portion. (3) The emission non-target sound removing portion includes: a pseudo emission non-target sound generating portion that generates a pseudo signal of the non-target sound that is emitted from the speaker and captured by each of the microphones, based on the sound source data for the sound emitting portion; and a subtraction portion that removes the generated pseudo signal from the input sound signal. (4) The sound source separating unit extracts the target sound by using the emission non-target sound removing portion to remove the non-target sound, and using the sound source separating portion to remove other non-target sound.

According to a third aspect of the present invention, there is provided a computer-readable medium having a sound source separation program that is executed by a computer mounted on a sound emitting and collecting apparatus including a sound collecting portion that captures surrounding sound using two microphones and a sound emitting portion that emits sound from at least one speaker. (1) The sound source separation program causes the computer to function as: (1-1) a sound source separating portion that extracts a target sound from a sound source that is in a predetermined direction, based on an input sound signal obtained by capturing surrounding sound using the two microphones; and (1-2) an emission non-target sound removing portion that removes a non-target sound that is emitted from the speaker and captured by each of the microphones, based on sound source data for the sound emitting portion, and is provided on a path that reaches the sound source separating portion. The emission non-target sound removing portion includes: a pseudo emission non-target sound generating portion that generates, based on the sound source data for the sound emitting portion, a pseudo signal of the non-target sound that is emitted from the speaker and captured by each of the microphones; and a subtraction portion that removes the generated pseudo signal from the input sound signal. (2) The sound source separation program causes the computer to extract the target sound by using the emission non-target sound removing portion to remove the non-target sound, and using the sound source separating portion to remove other non-target sound.

According to the aspects of the present invention described above, it is possible to provide a sound emitting and collecting apparatus, a sound source separating unit and a computer-readable medium having a sound source separation program that are capable of extracting a target sound from an intended sound source with a favorable SN ratio even in a situation in which there is emitted sound.

DETAILED DESCRIPTION OF THE EMBODIMENT(S)

Figure 1:
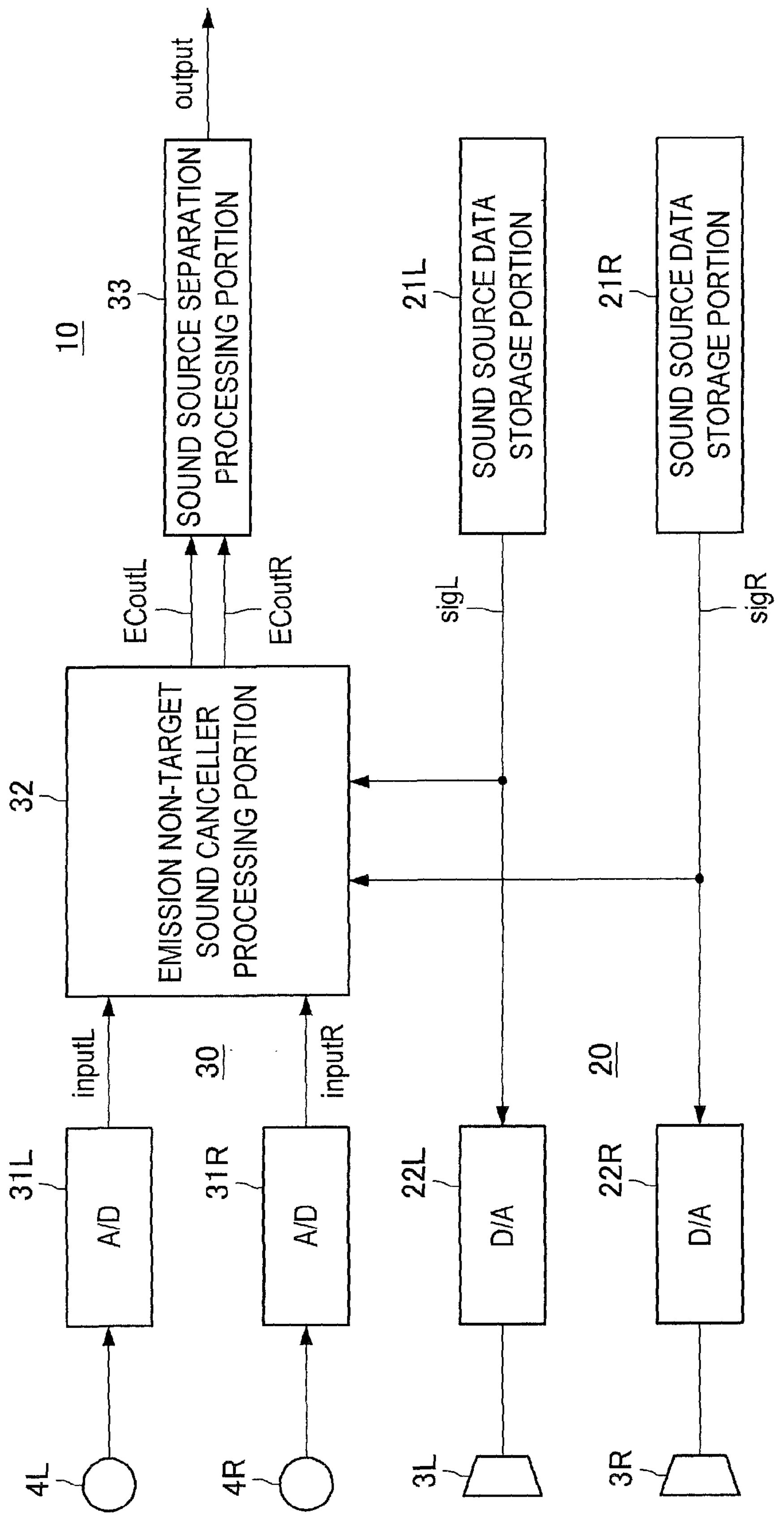
FIG. 1 is a block diagram showing a structure of a sound emitting and collecting apparatus according to a first embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) First Embodiment

Hereinafter, a first embodiment of a sound emitting and collecting apparatus, a sound source separating unit and a computer-readable medium having a sound source separation program according to the present invention will be explained with reference to the drawings.

(A-1) Structure of First Embodiment

The sound emitting and collecting apparatus of the first embodiment is structured such that a pair of microphones are mounted or externally attached and a pair of speakers are mounted or externally attached. For example, in a case of a sound emitting and collecting apparatus that uses a sound collecting device, such as a smart phone or a tablet terminal, a pair of microphones are mounted and a pair of speakers are externally attached. Further, for example, in a case of a sound emitting and collecting apparatus that corresponds to a speaker integrated audio device, it is structured such that a pair of speakers as well as a pair of microphones are mounted. In this manner, there are various connection configurations for a pair of microphones and a pair of speakers, and any connection configuration can be applied.

Figure 5:
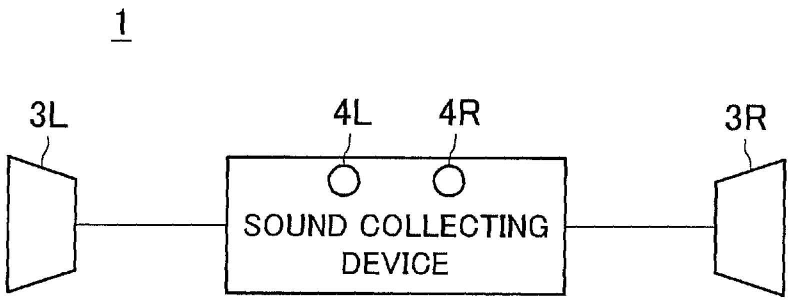
FIG. 5 is an explanatory diagram showing a state in which microphones are mounted when a sound source separation system is applied to the known sound emitting and collecting apparatus.

Hereinafter, an explanation will be made assuming that the sound emitting and collecting apparatus of the first embodiment is structured such that a pair of microphones are mounted and a pair of speakers are externally attached, as shown in FIG. 5. Further, with respect to the structural elements shown in FIG. 5, the reference numerals used in FIG. 5 are used as they are as the reference numerals of respective structural elements in the sound emitting and collecting apparatus of the first embodiment.

FIG. 1 is a block diagram showing the structure of a sound emitting and collecting apparatus 10 of the first embodiment. The sound emitting and collecting apparatus 10 of the first embodiment may be constructed by connecting various hardware structural elements, or may be constructed such that functions of some of the structural elements (for example, portions excluding the speakers, the microphones, analog/digital conversion portions (A/D conversion portions) and digital/analog conversion portions (D/A conversion portions)) are realized by applying an execution structure of a program of a CPU, a ROM, a RAM or the like. Regardless of the applied construction method, the detailed functional structure of the sound emitting and collecting apparatus 10 is the structure shown in FIG. 1. Note that, when a program is applied, the program may be a program that has been written in a memory of the sound emitting and collecting apparatus 10 at the time of shipment of the apparatus, or may be a program that is installed by download. For example, as the latter case, a case is conceivable in which the program is prepared as an application for a smart phone and a user who requires the program downloads and installs it via the Internet.

In FIG. 1, the sound emitting and collecting apparatus 10 of the first embodiment includes a sound emitting portion 20 and a sound collecting portion 30.

The sound emitting portion 20 has a similar structure to that of a known sound emitting portion. The sound emitting portion 20 includes sound source data storage portions 21L and 21R for an L channel and an R channel, D/A conversion portions 22L and 22R, and speakers 3L and 3R.

Figure 2:
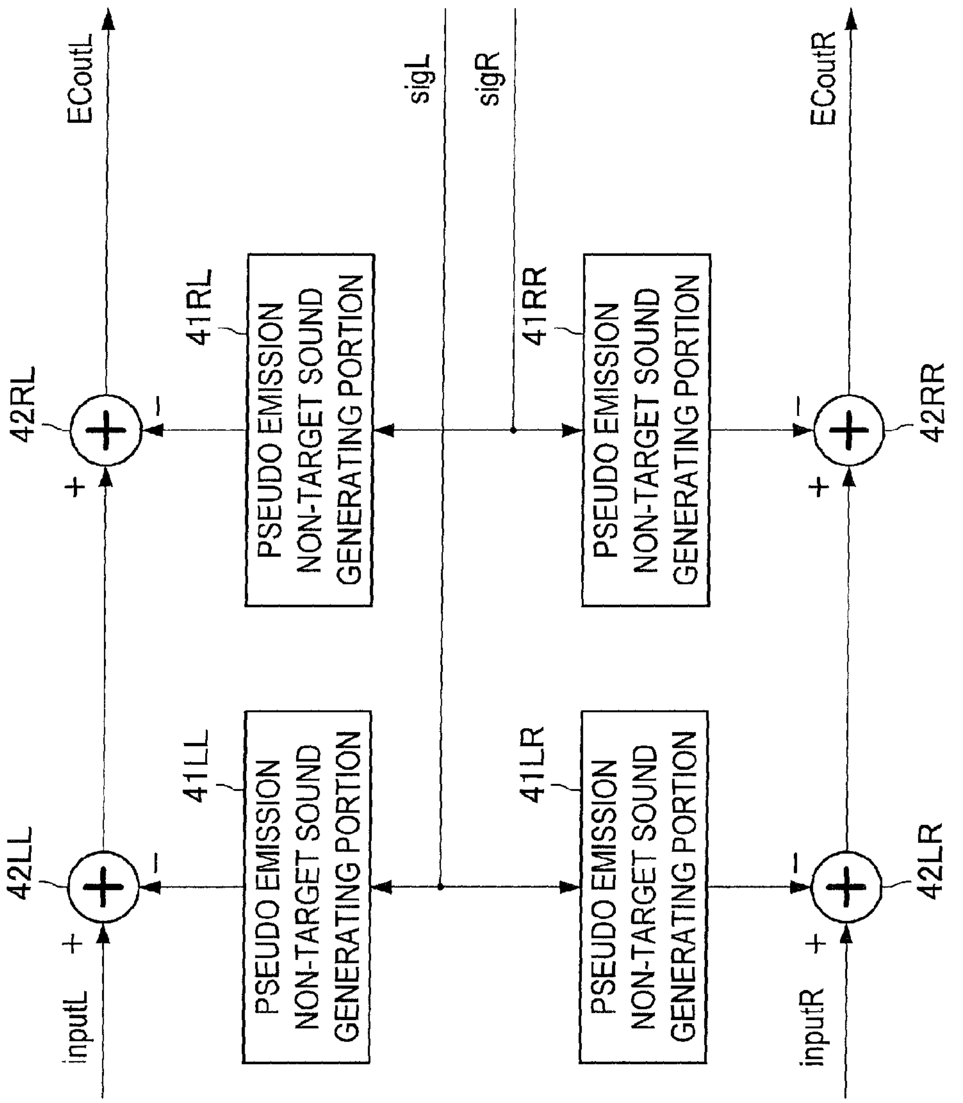
FIG. 2 is a block diagram showing a detailed structure of an emission non-target sound canceller processing portion in the sound emitting and collecting apparatus according to the first embodiment.

Meanwhile, the sound collecting portion 30 includes microphones 4L and 4R for the L channel and the R channel, A/D conversion portions 31L and 31R, an emission non-target sound canceller processing portion 32, the detailed structure of which is shown in FIG. 2, and a sound source separation processing portion 33. Here, the whole of the sound collecting portion 30 having an input terminal of sound source data (which will be described later) may be a unit that is constructed as a sound source separating unit and that is commercially available. Alternatively, a part formed by the A/D conversion portions 31L and 31R, the emission non-target sound canceller processing portion 32 and the sound source separation processing portion 33 may have an input terminal of the sound source data (which will be described later), and may be a unit that is constructed as a sound source separating unit and that is commercially available. In other words, the sound emitting and collecting apparatus 10, more specifically, the sound collecting portion 30, may be constructed using the sound source separating unit.

The sound source data storage portions 21L and 21R respectively store sound source data (digital signals) sigL and sigR for the L channel and the R channel, and read out and output the sound source data sigL and sigR under the control of a sound emission control portion (not shown in the drawings). The sound source data sigL and sigR may be, for example, music data or voice data for reading an electronic book or the like. Each of the sound source data storage portions 21L and 21R may be a storage medium access device in which a storage medium, such as a CD-ROM, is loaded, or may be a portion formed by a storage portion of the device that stores the sound source data acquired by communication from an external device, such as a site on the Internet. Each of the sound source data storage portions 21L and 21R may be a portion that corresponds to an externally attached device that is connected by a USB connector, for example. Further, although each of the sound source data storage portions 21L and 21R is called the "storage portion," the concept of each of the sound source data storage portions 21L and 21R includes a structure that outputs the received sound source data in real time, such as a receiver for a digital voice broadcast.

The D/A conversion portions 22L and 22R respectively convert the sound source data sigL and sigR output from the corresponding sound source data storage portions 21L and 21R into analog signals, and supply the analog signals to the corresponding speakers 3L and 3R.

The speakers 3L and 3R respectively emit and output (sound and output) the sound source signals supplied from the corresponding D/A conversion portions 22L and 22R. Here, the sound or voice emitted and output from the speakers 3L and 3R is not intended to be captured by the microphones 4R and 4L, and is a non-target sound in terms of a capturing function of the microphones 4R and 4L.

In the above description, the original signal format of the music emitted from each of the speakers 3L and 3R is a digital signal (the sound source data). However, the structure corresponding to the sound source data storage portions 21L and 21R may be a record player, an audio cassette tape recorder, an AM or FM radio receiver or the like that outputs an acoustic signal and a voice signal, which are analog signals. In this case, the D/A conversion portions 22L and 22R are omitted, and A/D conversion portions for the L channel and the R channel are additionally provided to convert the acoustic signal and the voice signal, which are analog signals, into digital signals. Then, the digital signals are supplied to the emission non-target sound canceller processing portion 32.

Each of the microphones 4R and 4L captures surrounding sound and converts the surrounding sound into an electrical signal (an analog signal). A stereo signal can be obtained by the pair of microphones 4R and 4L. Each of the microphones 4R and 4L has a directivity to mainly capture a sound coming from the front of the sound emitting and collecting apparatus 10. However each of the microphones 4R and 4L also captures sounds emitted from the speakers 3L and 3R disposed on both sides. Note that, although it is preferable that the speakers 3L and 3R be arranged on both sides of the pair of microphones 4R and 4L, the arrangement of the speakers 3L and 3R is not limited to this example.

For example, each of the microphones 4R and 4L is attached to the inside of a cylindrical body that is provided in a housing of the sound emitting and collecting apparatus 10. Here, a sound insulation member made of a synthetic resin is provided on an inner surface of the cylindrical body, and when the microphones 4R and 4L are attached, a path through which sound passes is inhibited from being formed inside and outside the housing. It is thus possible to prevent as much as possible the microphones 4R and 4L from capturing noise generated inside the housing or noise that comes into the housing from the outside and goes outside the housing as a result of reflection.

The A/D conversion portions 31L and 31R respectively convert input sound signals obtained by capturing surrounding sound using the corresponding microphones 4R and 4L, into digital signals inputL and inputR, and supplies them to the emission non-target sound canceller processing portion 32. The A/D conversion portions 31L and 31R respectively convert the input sound signals into, for example, digital signals whose sampling rates are the same as the sampling rates of the sound source data sigL and sigR.

The sound source data sigL and sigR output from the sound source data storage portions 21L and 21R are also supplied to the emission non-target sound canceller processing portion 32. Here, it is necessary for the sampling rates of the four digital signals input to the emission non-target sound canceller processing portion 32 to be the same as each other. For example, when the sampling rates of the sound source data sigL and sigR downloaded from an Internet site and stored in the sound source data storage portions 21L and 21R are different from the sampling rates of the digital signals inputL and inputR supplied from the A/D conversion portions 31L and 31R, the downloaded sound source data sigL and sigR may be supplied as they are to the D/A conversion portions 22L and 22R, and the sound source data, for which the sampling rates of the sound source data sigL and sigR have been converted, may be supplied to the emission non-target sound canceller processing portion 32.

Based on the sound source data sigL and sigR output from the sound source data storage portions 21L and 21R, the emission non-target sound canceller processing portion 32 removes (or reduces) non-target sound components (hereinafter referred to as emission non-target sounds, as appropriate) that are included in the input sound signals (the digital signals) inputL and inputR as a result of being emitted from the speakers 3L and 3R, and supplies the resultant input sound signals to the sound source separation processing portion 33.

Based on input sound signals ECoutL and ECoutR that are obtained after removing the emission non-target sounds, the sound source separation processing portion 33 extracts only a target sound that comes from a sound source in a predetermined direction (the front, for example). Any known sound source separation system may be applied as the sound source separation system to be used by the sound source separation processing portion 33. For example, it is possible to apply the sound source separation system described in Japanese Patent Application Publication No. JP-A-2013-061421.

The sound emitting and collecting apparatus 10 of the first embodiment extract the target sound by using the emission non-target sound canceller processing portion 32 to remove the non-target sound caused by the emission from the apparatus itself, and using the sound source separation processing portion 33 to remove the other non-target sounds.

The method for processing the extracted target sound is not limited. For example, when the intended purpose of the extracted target sound is a voice communication, the extracted target sound is processed as transmitted voice. Further, for example, when the intended purpose of the extracted target sound is a voice command, speech recognition is performed on the extracted target sound. After that, it is checked with which command the recognized voice corresponds.

FIG. 2 is a block diagram showing a detailed structure of the emission non-target sound canceller processing portion 32.

In FIG. 2, the emission non-target sound canceller processing portion 32 includes four pseudo emission non-target sound generating portions 41LL to 41RR, and four subtraction portions 42LL to 42RR.

The unnecessary sounds (the emission non-target sounds) in terms of the target sound that are emitted from the speakers 3L and 3R and captured by the microphones 4R and 4L can be considered in the same way as an acoustic echo that has become a problem in telephone communication. Therefore, in the first embodiment, the emission non-target sound canceller processing portion 32 is formed using acoustic echo canceller technology (a "stereo echo canceller" is described, for example, in "Digital voice and audio technology (Network Innovation technology series, 1999)", written by Nobuhiko Kitawaki, published by the telecommunications association, pages 218 to 243.

Based on the sound source data sigL, the pseudo emission non-target sound generating portion 41LL generates a pseudo emission non-target sound that simulates the emission non-target sound which is included in the input sound signal inputL of the L channel and which is emitted from the speaker 3L and captured by the microphone 4L. The subtraction portion 42LL subtracts, from the input sound signal inputL of the L channel, the pseudo emission non-target sound generated by the pseudo emission non-target sound generating portion 41LL, and thus removes, from the input sound signal inputL of the L channel, components of the emission non-target sound emitted from the speaker 3L and captured by the microphone 4L.

Based on the sound source data sigR, the pseudo emission non-target sound generating portion 41RL generates a pseudo emission non-target sound that simulates the emission non-target sound which is included in the input sound signal inputL of the L channel and which is emitted from the speaker 3R and captured by the microphone 4L. The subtraction portion 42RL subtracts, from the output sound signal of the pseudo emission non-target sound generating portion 41LL, the pseudo emission non-target sound generated by the pseudo emission non-target sound generating portion 41RL, and thus removes, from the output sound signal of the pseudo emission non-target sound generating portion 41LL, components of the emission non-target sound emitted from the speaker 3R and captured by the microphone 4L.

As a result, the input sound signal ECoutL output from the pseudo emission non-target sound generating portion 41RL becomes a signal obtained by removing, from the input sound signal inputL, the components of the emission non-target sound emitted from the speaker 3L and captured by the microphone 4L and the components of the emission non-target sound emitted from the speaker 3R and captured by the microphone 4L.

Based on the sound source data sigL, the pseudo emission non-target sound generating portion 41LR generates a pseudo emission non-target sound that simulates the emission non-target sound which is included in the input sound signal inputR of the R channel and which is emitted from the speaker 3L and captured by the microphone 4R. The subtraction portion 42LR subtracts, from the input sound signal inputR of the R channel, the pseudo emission non-target sound generated by the pseudo emission non-target sound generating portion 41LR, and thus removes, from the input sound signal inputR of the R channel, components of the emission non-target sound emitted from the speaker 3L and captured by the microphone 4R.

Based on the sound source data sigR, the pseudo emission non-target sound generating portion 41RR generates a pseudo emission non-target sound that simulates the emission non-target sound which is included in the input sound signal inputR of the R channel and which is emitted from the speaker 3R and captured by the microphone 4R. The subtraction portion 42RR subtracts, from the output sound signal of the pseudo emission non-target sound generating portion 41LR, the pseudo emission non-target sound generated by the pseudo emission non-target sound generating portion 41RR, and thus removes, from the output sound signal of the pseudo emission non-target sound generating portion 41LR, components of the emission non-target sound emitted from the speaker 3R and captured by the microphone 4R.

As a result, the input sound signal ECoutR output from the pseudo emission non-target sound generating portion 41 RR becomes a signal obtained by removing, from the input sound signal inputR, the components of the emission non-target sound emitted from the speaker 3L and captured by the microphone 4R and the components of the emission non-target sound emitted from the speaker 3R and captured by the microphone 4R.

The pseudo emission non-target sound generating portions 41LL to 41RR are respectively formed by adaptive filters such as those used in an acoustic echo canceller. An algorithm that is applied to these adaptive filters is not particularly limited, and for example, a normalized LMS algorithm can be applied.

Here, when the pair of microphones 4L and 4R as well as the pair of speakers 3L and 3R are mounted on the sound emitting and collecting apparatus 10 and respective acoustic paths in combinations of the microphones and the speakers connected via the acoustic paths are fixed (the length and the positional relationship are fixed), the adaptive filters may be replaced by digital filters whose filter coefficients are fixed, and the digital filters may be used as the filters that form the pseudo emission non-target sound generating portions 41LL to 41 RR. Note that, even when the acoustic paths are fixed, the adaptive filters may be applied taking into consideration reflection from a wall surface or the like.

(A-2) Operations of First Embodiment

Next, the operations of the sound emitting and collecting apparatus 10 of the first embodiment will be explained. Hereinafter, the explanation will be given assuming, as necessary, that the sound source data is music data and the target sound is a voice pronounced by a user who is in front of the sound emitting and collecting apparatus 10.

The sound source data (the music data) read out from each of the sound source data storage portions 21L and 21R is converted into an analog signal by the corresponding D/A conversion portions 22L and 22R, and thereafter emitted from each of the speakers 3L and 3R. When this type of music is playing from the sound emitting and collecting apparatus 10, a voice pronounced toward the sound emitting and collecting apparatus 10 by the user is captured by the two microphones 4L and 4R. At this time, since the music from the speakers 3L and 3R is also playing, the music from the speaker 3L is also captured by the two microphones 4L and 4R and the music from the speaker 3R is also captured by the two microphones 4L and 4R. Further, surrounding background noise (such as an operating sound of an air conditioner or a travelling sound of a vehicle travelling in the vicinity) is also captured by the two microphones 4L and 4R.

In other words, in addition to the target sound, which is the voice of the user, the input sound signal obtained by capturing surrounding sound using each of the microphones 4L and 4R includes an emission non-target sound, which is the music emitted by the apparatus itself, and a non-target sound such as background noise (hereinafter referred to as a background non-target sound, as appropriate).

The input sound signals obtained by capturing surrounding sound using the microphones 4L and 4R are respectively converted into the digital signals inputL and inputR by the corresponding A/D conversion portions 31L and 31R, and supplied to the emission non-target sound canceller processing portion 32. The sound source data sigL and sigR are also supplied to the emission non-target sound canceller processing portion 32.

Based on the sound source data sigL, the pseudo emission non-target sound generating portion 41LL generates the pseudo emission non-target sound that simulates the emission non-target sound emitted from the speaker 3L and captured by the microphone 4L. Based on the sound source data sigR, the pseudo emission non-target sound generating portion 41RL generates the pseudo emission non-target sound that simulates the emission non-target sound emitted from the speaker 3R and captured by the microphone 4L. Then, these two types of pseudo emission non-target sound are respectively subtracted and removed from the input sound signal inputL of the L channel by the subtraction portions 42LL and 42RL. Then, the input sound signal ECoutL of the L channel after the removal is supplied to the sound source separation processing portion 33.

Further, based on the sound source data sigL, the pseudo emission non-target sound generating portion 41LR generates the pseudo emission non-target sound that simulates the emission non-target sound emitted from the speaker 3L and captured by the microphone 4R. Further, based on the sound source data sigR, the pseudo emission non-target sound generating portion 41RR generates the pseudo emission non-target sound that simulates the emission non-target sound emitted from the speaker 3R and captured by the microphone 4R. Then, these two types of pseudo emission non-target sound are respectively subtracted and removed from the input sound signal inputR of the R channel by the subtraction portions 42LR and 42RR. Then, the input sound signal ECoutR of the R channel after the removal is supplied to the sound source separation processing portion 33.

Then, based on the pair of input sound signals ECoutL and ECoutR that are obtained after removing the components of the emission non-target sound, the sound source separation processing portion 33 performs sound source separation processing, and the background non-target sound is eliminated. The target sound output, which is the voice of the user that comes from the front direction, is extracted and is output to a processing portion of the next stage.

(A-3) Effects of First Embodiment

According to the first embodiment, instead of capturing the non-target sounds collectively, the non-target sounds are classified into the emission non-target sound and the background non-target sound, and the target sound is extracted by applying the removal processing that is appropriate for each of the non-target sounds. It is therefore possible to significantly improve the accuracy of extraction of the target sound.

On the other hand, when the non-target sounds are collectively captured and the target sound is extracted only by the processing by the sound source separation processing portion 33 without providing the emission non-target sound canceller processing portion 32, the components of the emitted emission non-target sound remain in the extracted target sound. As a result, it is difficult to catch the voice even when the extracted target sound is listened to, and when speech recognition is performed, the recognition rate is low.

An experiment was performed in which the pair of microphones 4L and 4R were separated from each other by a distance of several centimeters to several tens of centimeters, and a voice was emitted from a position that is separated from the front of the microphones 4L and 4R by one meter to several meters, while music was being emitted at a volume at which it was possible to enjoy the music. Then, using the method of the first embodiment, the voice (the target sound) was extracted. When the sound picked up by the microphones 4L and 4R was listened to without processing, the voice was embedded in the music and was hardly audible. There were few components of the emission non-target sound left in the target sound signal obtained by the method of the first embodiment, and the target sound signal mainly included just the components of the voice. When the extracted target sound was listened to, the content of the voice could be sufficiently and clearly grasped.

(B) Second Embodiment

Next, a second embodiment of the sound emitting and collecting apparatus, the sound source separating unit and a computer-readable medium having the sound source separation program according to the present invention will be explained with reference to the drawings.

Figure 3:
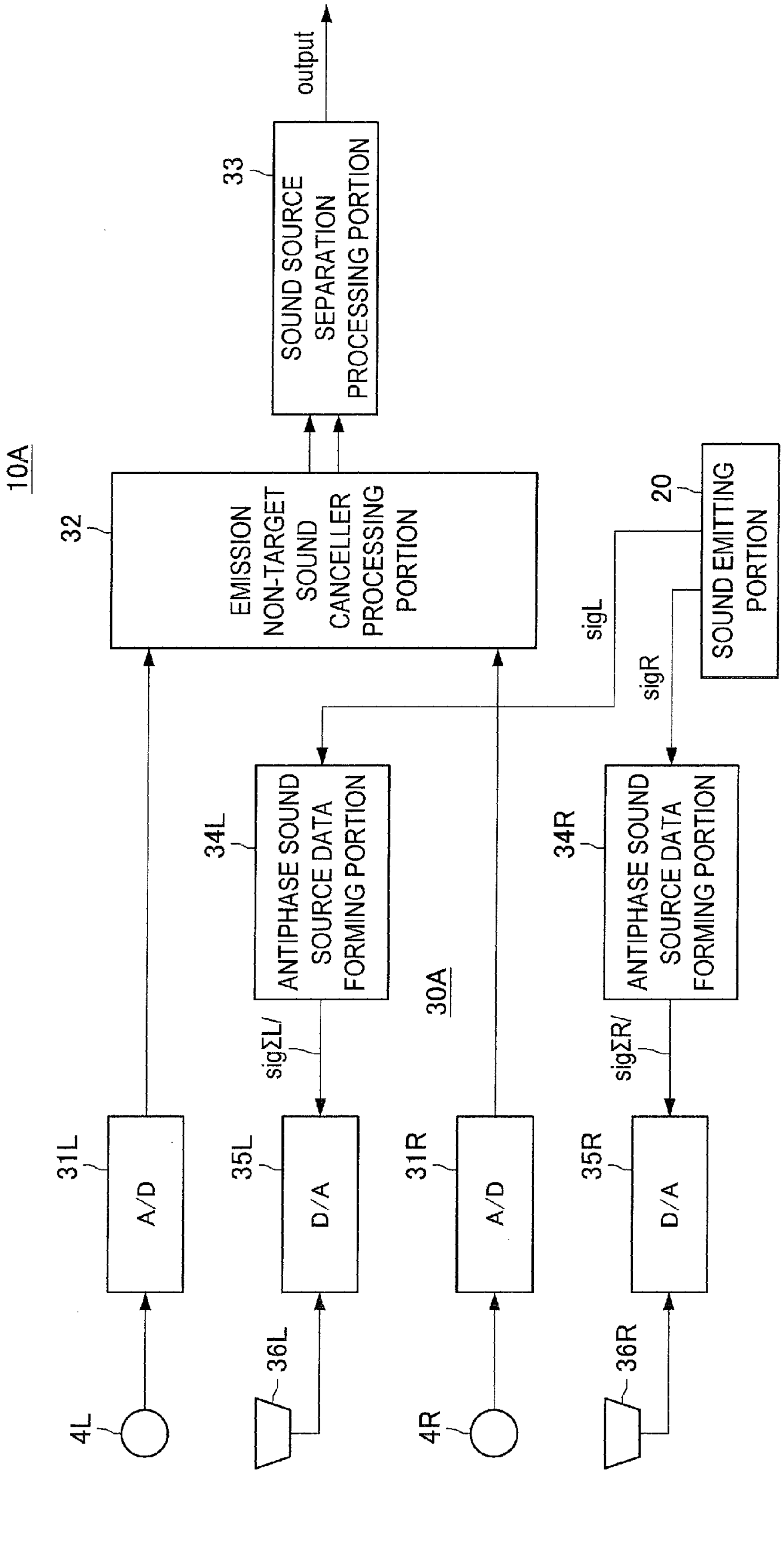
FIG. 3 is a block diagram showing a structure of a sound emitting and collecting apparatus according to a second embodiment.
Figure 4:
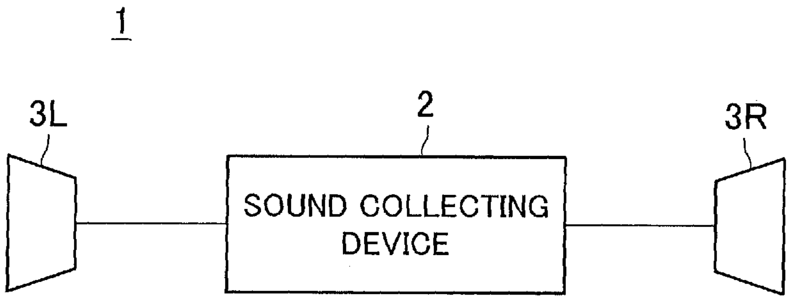
FIG. 4 is an explanatory diagram showing a connection state of speakers in a known sound emitting and collecting apparatus.

FIG. 3 is a block diagram showing the structure of a sound emitting and collecting apparatus 10A according to the second embodiment, and portions that are the same as or correspond to those in FIG. 1 according to the first embodiment are denoted by the same reference numerals.

In the sound emitting and collecting apparatus 10A of the second embodiment, the structure of a sound collecting portion 30A is different from that of the sound collecting portion 30 of the first embodiment. The sound collecting portion 30A includes antiphase sound source data forming portions 34L and 34R, D/A conversion portions 35L and 35R, and sub-speakers 36L and 36R, in addition to the microphones 4L and 4R, the A/D conversion portions 31L and 31R, the emission non-target sound canceller processing portion 32 and the sound source separation processing portion 33.

The antiphase sound source data forming portion 34L forms antiphase sound source data sigLL/ and sigRL/ which are antiphase of the sound source data sigL and sigR output from the sound source data storage portions 21L and 21R and which have phase differences and gains that are set taking into consideration propagation delay and attenuation on sound emission acoustic paths from the speakers 3L and 3R to the microphone 4L. After that, the antiphase sound source data forming portion 34L synthesizes the antiphase sound source data sigLL/ and sigRL/ to obtain synthesized antiphase sound source data sigΣL/, and supplies it to the D/A conversion portion 35L.

The antiphase sound source data forming portion 34R forms antiphase sound source data sigLR/ and sigRR/ which are antiphases of the sound source data sigL and sigR output from the sound source data storage portions 21L and 21R and which have phase differences and gains that are set taking into consideration propagation delay and attenuation on sound emission acoustic paths from the speakers 3L and 3R to the microphone 4R. After that, the antiphase sound source data forming portion 34R synthesizes the antiphase sound source data sigLR/ and sigRR/ to obtain synthesized antiphase sound source data sigΣR/, and supplies it to the D/A conversion portion 35R.

Note that information about the propagation delay and attenuation on the sound emission acoustic paths that is required by the antiphase sound source data forming portions 34L and 34R may be obtained by the antiphase sound source data forming portions 34L and 34R comparing (cross-correlating) the sound source data sigL and sigR with the input sound signals inputL and inputR. Alternatively, the information may be obtained by extracting corresponding information from the adaptive filters in the emission non-target sound canceller processing portion 32.

The D/A conversion portions 35L and 35R respectively convert the synthesized antiphase sound source data sigΣL/ and sigΣR/ output from the corresponding antiphase sound source data forming portions 34L and 34R into analog signals, and supply the analog signals to the corresponding sub-speakers 36L and 36R.

The sub-speaker 36L is provided such that it emits sound to a space of the cylindrical body, to which the microphone 4L is attached, on a capturing surface side of the microphone 4L. The sub-speaker 36L emits sound based on the analog signal converted from the synthesized antiphase sound source data sigΣL/.

The sub-speaker 36R is provided such that it emits sound to a space of the cylindrical body, to which the microphone 4R is attached, on a capturing surface side of the microphone 4R. The sub-speaker 36R emits sound based on the analog signal converted from the synthesized antiphase sound source data sigΣR/.

The emission non-target sound relating to the sound source data sigL via the sound emission acoustic path from the speaker 3L to the microphone 4L, the emission non-target sound relating to the sound source data sigR via the sound emission acoustic path from the speaker 3R to the microphone 4L, and a antiphase emission non-target sound relating to the synthesized antiphase sound source data sigΣL/ emitted from the sub-speaker 36L are emitted to a space to be captured by the microphone 4L. Due to superimposition of antiphase components, the emission target sound from the speakers 3L and 3R to the microphone 4L is significantly cancelled out. In other words, the components of the emission non-target sound in the input sound signal obtained by capturing surrounding sound using the microphone 4L are significantly reduced.

Further, the emission non-target sound relating to the sound source data sigL via the sound emission acoustic path from the speaker 3L to the microphone 4R, the emission non-target sound relating to the sound source data sigR via the sound emission acoustic path from the speaker 3R to the microphone 4R, and the antiphase emission non-target sound relating to the synthesized antiphase sound source data sigΣR/ emitted from the sub-speaker 36R are emitted to a space to be captured by the microphone 4R. Due to superimposition of antiphase components, the emission target sound from the speakers 3L and 3R to the microphone 4R is significantly cancelled out. In other words, the components of the emission non-target sound in the input sound signal obtained by capturing surrounding sound using the microphone 4R are significantly reduced.

As a result, when the emission non-target sound is further removed by the emission non-target sound canceller processing portion 32, there are extremely few emission non-target sound components in the input sound signals ECoutL and ECoutR output from the emission non-target sound canceller processing portion 32.

Also according to the second embodiment, instead of capturing the non-target sounds collectively, the non-target sounds are classified into the emission non-target sound and the background non-target sound, and the target sound is extracted by applying the removal processing that is appropriate for each of the non-target sounds. It is therefore possible to significantly improve the accuracy of extraction of the target sound.

According to the second embodiment, two types of removal structures are applied to remove the emission non-target sounds. Therefore, it is possible to remove the emission non-target sounds more appropriately than in the first embodiment, and it is possible to further improve the accuracy of extraction of the target sound.

(C) Other Embodiments

Although various modified embodiments are described in the explanation of each of the above-described embodiments, modified embodiments exemplified below can be further provided.

In each of the above-described embodiments, a case is described in which the number of speakers is two. However, the number of speakers may be one or three or more. The number of microphones is also not limited to two, and three or more microphones may be used. The internal structure of the emission non-target sound canceller processing portion 32 may be designed taking into consideration the number of sound emission acoustic paths that is set corresponding to the number of speakers and microphones.

In the first embodiment, only the emission non-target sound canceller processing portion is provided as the removal structure of the emission non-target sound. In the second embodiment, the emission non-target sound canceller processing portion and the removal structure in which the sub-speaker is used for antiphase superimposition are provided as the removal structure of the emission non-target sound. However, only the removal structure in which the sub-speaker is used for antiphase superimposition may be used as the removal structure of the emission non-target sound. In summary, it is sufficient if the removal structure of the emission non-target sound and the removal structure of the background non-target sound are separately provided.

Figure 6:
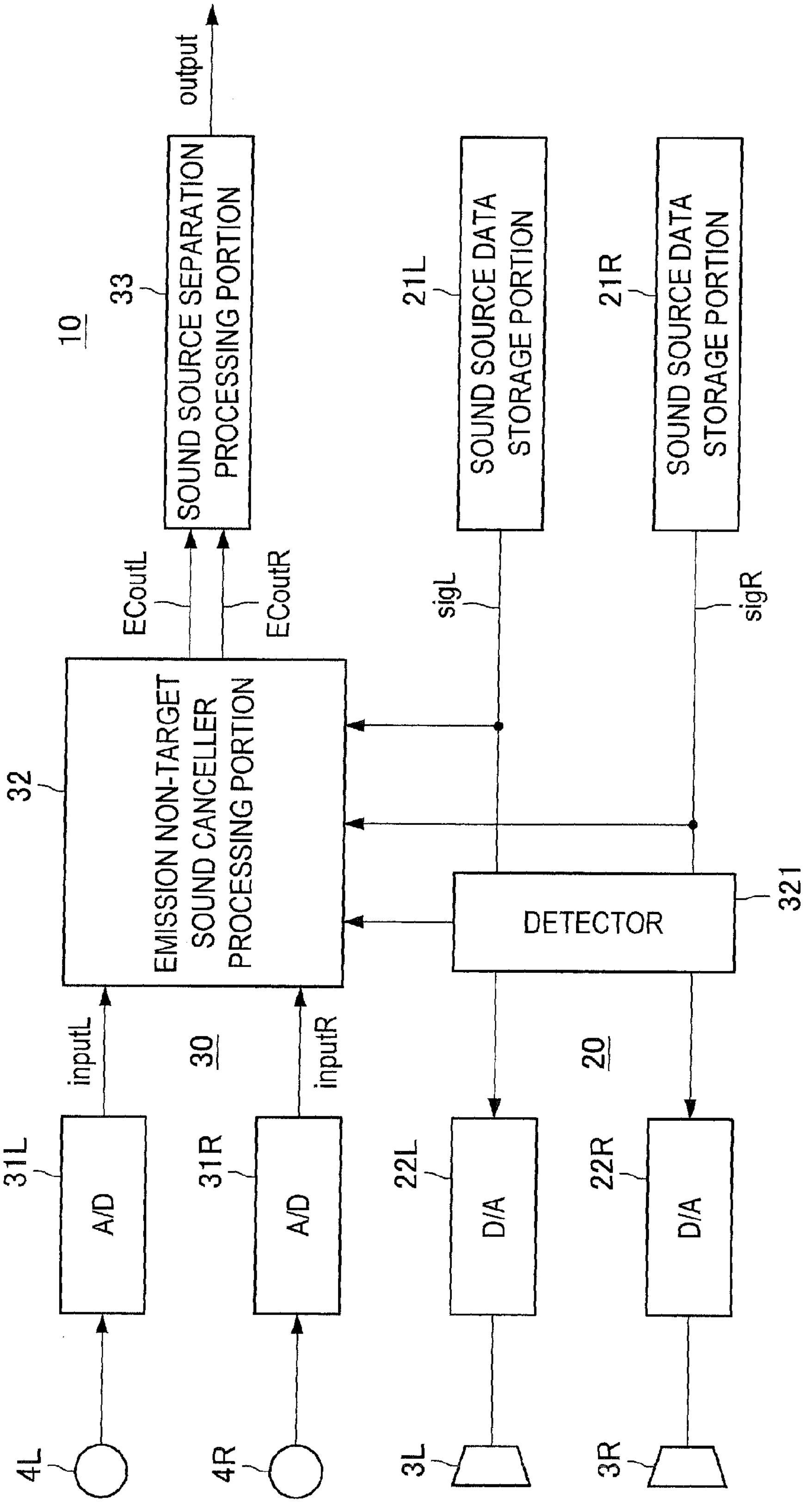
FIG. 6 is a block diagram showing a structure of a sound emitting and collecting apparatus according to another embodiment.

In the explanation of each of the above-described embodiments, the removal structure of the emission non-target sound, such as the emission non-target sound canceller processing portion, is constantly operated. However, a period during which the removal structure is operated may be set. For example, as shown in FIG. 6, based on an operation mode of the apparatus detected by a detector 321, at that point, if it is possible to ascertain a case in which sound emission operations by the speakers 3L and 3R are not performed (for example, a case in which reproducing of music data is not commanded, or a case in which sound is output to external speakers other than the speakers 3L and 3R), or a case in which the target sound is not input (for example, a case in which a voice command input mode is not set), the removal structure of the emission non-target sound may be stopped in such cases.

Further, the user may be allowed to select whether or not to operate the removal structure of the emission non-target sound. Further, the user may be allowed to select whether or not to operate one of the emission non-target sound canceller processing portion and the removal structure in which the sub-speaker is used for antiphase superimposition. The user may be allowed to select whether or not to adaptively operate the adaptive filters in the emission non-target sound canceller processing portion. When the user selects not to adaptively operate the adaptive filters, the adaptive filters may be operated as fixed digital filters by using the filter coefficient obtained by the adaptive operation immediately before the selection.

Before reproducing the emission non-target sound, a test signal, such as white noise, may be reproduced, characteristics of the acoustic paths from the speakers 3L and 3R to the microphones 4L and 4R may be estimated by the pseudo emission non-target sound generating portions 41LL to 41RR during the reproducing of the test signal, and the estimation may be stopped at the same time as the completion of the reproducing of the test signal. From the following music period, the pseudo emission non-target sound may be generated based on the aforementioned characteristics of the acoustic paths. An operation example in this case is as follows. First, the characteristics of the acoustic paths from the speakers 3L and 3R to the microphones 4L and 4R are estimated by the pseudo emission non-target sound generating portions 41LL to 41RR in a test signal period, and the estimation is stopped at the same time as the completion of the reproducing of the test signal. At this time point, the characteristics of the acoustic path from the speaker 3L to the microphone 4L have been set in the pseudo emission non-target sound generating portion 41LL. Then, the sound source data sigL is superimposed on the characteristics of the acoustic path to generate the pseudo emission non-target sound. In the same manner, the characteristics of the acoustic path from the speaker 3R to the microphone 4L have been set in the pseudo emission non-target sound generating portion 41RL, the characteristics of the acoustic path from the speaker 3L to the microphone 4R have been set in the pseudo emission non-target sound generating portion 41LR, and the characteristics of the acoustic path from the speaker 3R to the microphone 4R have been set in the pseudo emission non-target sound generating portion 41RR. Based on the characteristics of each of the acoustic paths, the pseudo emission non-target sound is generated. Then, the subtraction portions 42LL to 42RR subtract the pseudo emission non-target sound from the input sound signal. It is thus possible to remove the emission non-target sound components.

In the explanation of the above-described embodiments, intended purposes of the sound emitting and collecting apparatuses 10 and 10A are not described. However, the sound emitting and collecting apparatuses 10 and 10A can be widely applied to apparatuses in which a sound emitting operation and a sound collecting operation may be performed at the same time. For example, the technological idea of the present invention can be applied to a hands-free telephone apparatus, a car navigation system and the like that can receive voice commands and that have a function of receiving FM broadcast and AM broadcast.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A sound emitting and collecting apparatus including a sound collecting portion that captures surrounding sound using two microphones, and a sound emitting portion that emits sound from left and right speakers, the sound emitting and collecting apparatus comprising:

a sound source separating portion that extracts a target sound from a sound source that is in a predetermined direction, based on an input sound signal obtained by capturing surrounding sound using the two microphones; and an emission non-target sound removing portion that removes a non-target sound that is emitted from the left and right speakers and captured by each of the microphones, based on sound source data from the sound emitting portion, the emission non-target sound removing portion being provided on a path that reaches the sound source separating portion, wherein the sound emitting and collecting apparatus extracts the target sound by using the emission non-target sound removing portion to remove part of the non-target sound, and using the sound source separating portion to remove another part of the non-target sound, wherein the left speaker is disposed to the left of the two microphones and the right speaker is disposed to the right of the two microphones.

2. The sound emitting and collecting apparatus according to claim 1, wherein the emission non-target sound removing portion includes:

a pseudo emission non-target sound generating portion that generates a pseudo signal of the non-target sound that is emitted from the left and right speakers and captured by each of the microphones, based on the sound source data from the sound emitting portion, and a subtraction portion that removes the generated pseudo signal from the input sound signal.

3. The sound emitting and collecting apparatus according to claim 2, wherein the pseudo emission non-target sound generating portion generates the pseudo signal by estimating characteristics of an acoustic path from each of the left and right speakers to each of the microphones only in a test signal period in which a test signal is reproduced by the left and right speakers prior to the non-target sound, stopping the estimation in a period in which the non-target sound is reproduced, and superimposing the characteristics of the acoustic path obtained in the test signal period on the sound source data from the sound emitting portion.

4. The sound emitting and collecting apparatus according to claim 3, wherein the test signal that is reproduced prior to the non-target sound is white noise.

5. The sound emitting and collecting apparatus according to claim 2, wherein the emission non-target sound removing portion includes:

an antiphase sound forming portion that, based on the sound source data from the sound emitting portion, forms an antiphase sound signal to be emitted to a respective capture space of each of the microphones and cancel out an emitted sound, and a sub-speaker that emits the formed antiphase sound signal to the respective capture space of each of the microphones.

6. The sound emitting and collecting apparatus according to claim 1, wherein the emission non-target sound removing portion includes:

an antiphase sound forming portion that, based on the sound source data from the sound emitting portion, forms an antiphase sound signal to be emitted to a respective capture space of each of the microphones and cancel out an emitted sound, and a sub-speaker that emits the formed antiphase sound signal to the respective capture space of each of the microphones.

7. A sound source separating unit that is applied to a sound emitting and collecting apparatus including a sound collecting portion that captures surrounding sound using two microphones and a sound emitting portion that emits sound from left and right speakers, the sound source separating unit comprising:

a sound source separating portion that extracts a target sound from a sound source that is in a predetermined direction, based on an input sound signal obtained by capturing surrounding sound using the two microphones; and an emission non-target sound removing portion that removes a non-target sound that is emitted from the left and right speakers and captured by each of the microphones, based on sound source data from the sound emitting portion, the emission non-target sound removing portion being provided on a path that reaches the sound source separating portion, wherein the emission non-target sound removing portion includes a pseudo emission non-target sound generating portion that generates a pseudo signal of the non-target sound that is emitted from the left and right speakers and captured by each of the microphones, based on the sound source data from the sound emitting portion, and a subtraction portion that removes the generated pseudo signal from the input sound signal, and wherein the sound source separating unit extracts the target sound by using the emission non-target sound removing portion to remove part of the non-target sound, and using the sound source separating portion to remove another part of the non-target sound, wherein the left speaker is disposed to the left of the two microphones and the right speaker is disposed to the right of the two microphones.

8. A non-transitory computer-readable medium having a sound source separation program that is executed by a computer mounted on a sound emitting and collecting apparatus including a sound collecting portion that captures surrounding sound using two microphones and a sound emitting portion that emits sound from left and right speakers, the sound source separation program causing the computer to function as:

a sound source separating portion that extracts a target sound from a sound source that is in a predetermined direction, based on an input sound signal obtained by capturing surrounding sound using the two microphones; and an emission non-target sound removing portion that removes a non-target sound that is emitted from the left and right speakers and captured by each of the microphones, based on sound source data from the sound emitting portion, the emission non-target sound removing portion being provided on a path that reaches the sound source separating portion, wherein the emission non-target sound removing portion includes a pseudo emission non-target sound generating portion that generates a pseudo signal of the non-target sound that is emitted from the left and right speakers and captured by each of the microphones, based on the sound source data from the sound emitting portion, and a subtraction portion that removes the generated pseudo signal from the input sound signal, and wherein the sound source separation program causes the computer to extract the target sound by using the emission non-target sound removing portion to remove part of the non-target sound, and using the sound source separating portion to remove another part of the non-target sound, wherein the left speaker is disposed to the left of the two microphones and the right speaker is disposed to the right of the two microphones.

* * * * *